No. 647,022. Patented Apr. 10, 1900.
F. H. PARADICE.
HOSE CONNECTION.
(Application filed July 24, 1899.)
(No Model.)
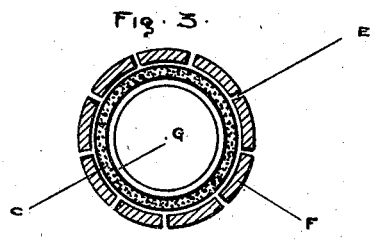
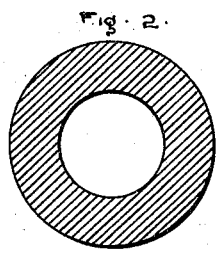
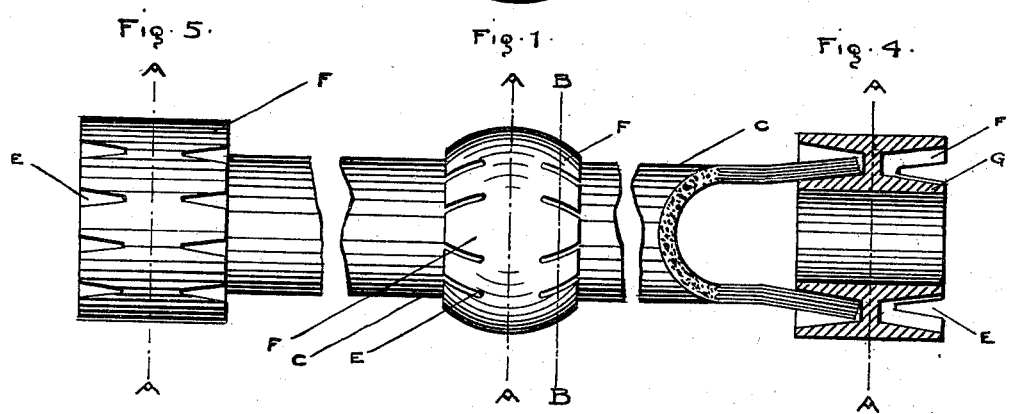
Witnesses
Frank M. Havens.
Fred J. Paradice.
Inventor
Frank H. Paradice
THE NORRIS PETERS CO., PHOTO-LITHO., WASHINGTON, D. C.

UNITED STATES PATENT OFFICE.

FRANK H. PARADICE, OF DENVER, COLORADO.

HOSE CONNECTION.

SPECIFICATION forming part of Letters Patent No. 647,022, dated April 10, 1900.

Application filed July 24, 1899. Serial No. 725,024. (No model.)

*To all whom it may concern:*

Be it known that I, FRANK H. PARADICE, a citizen of the United States, residing at Denver, in the county of Arapahoe and State of Colorado, have invented new and useful Improvements in Hose Connections, of which the following is a specification.

My invention relates to hose connections or menders used to connect two sections of hose together—generally to connect hose that has had a defective piece cut out, but is also useful to join two or more sections of unused hose.

Hose-menders have heretofore been made of an inner tube of metal or wood, the hose fastened thereto by bands of wire or rings of metal clamped on in different ways. Among the defects of these different styles of repair-couplings are insufficient grip or tenacity, excepting when fastened by the use of special tools not generally available at dwellings where garden-hose is chiefly used; the catching of clamps (whether of wire or those fastened with screws) on the edges of sidewalks or other obstacles when dragging hose from one point to another, due to the uneven and unsuitable exterior form of the clamps, this causing the user to return to free the hose or the joint to pull apart by the extra strain required to free it, and the early wearing out of the menders as heretofore made.

My invention overcomes the objections named above, increases the lasting qualities of hose-menders and hose, and by simplifying their construction decreases their cost.

I accomplish what is before said in favor of my invention by making it in one piece of metal, by preference of cast-brass or malleable iron, and making it globular in form, (when attached,) the most suitable shape for the purpose, as is shown on the accompanying drawings and is explained in these specification.

Figure 1 shows the hose-mender as it appears when fastened by hammering down the points or fingers F. Fig. 2 is a cross-section at A A on Figs. 1, 4, and 5. Fig. 3 is a cross-section of Fig. 1 at B B, showing hose C cut through. Fig. 4 is a sectional view of mender before being fastened by hammering down points F. Fig. 5 is an elevation of mender before being fastened on hose.

Similar letters refer to similar parts in the several views.

C represents the hose; E, slots in outer shell of mender; F, points or fingers in outer shell of mender, and G the inner tube of mender.

The manner in which this repairer is attached is as follows: The inner tube G of mender is forced into hose, as indicated at Fig. 4, and the points or fingers F on an outer portion or shell are hammered down, causing them to bend in and grip the hose C against the inner tube G, assuming at one end of mender the form shown at Fig. 1. The end of the other piece of hose is inserted and fastened in like manner. Then the whole mender assumes the appearance of Fig. 1.

Although this description is in relation to the use of this mender (or "joiner," as it might properly be called) as a hose-joiner, it is equally serviceable as a joiner of lead pipe or any tube or pipe of ductile metal or other pliable or yielding material. The fastening feature of this joiner might be applied to stop-cocks, faucets, or other fittings for use with pipe or tubing, particularly lead pipe.

Having described my invention and its use, what I claim as new, and for which I desire Letters Patent, is—

1. A hose, pipe, or tube joiner, made complete in one piece, having an inner tube for insertion into tube to be joined, and an outer portion or shell which will surround the tube to be joined; said outer portion having its edges longitudinally slotted substantially as shown.

2. A hose clamp or band in the shape of a cylinder having its edges slotted longitudinally.

In testimony whereof I affix my signature in the presence of two witnesses.

FRANK H. PARADICE.

Witnesses:
 FRANK M. HAVENS,
 HELEN M. DEAN.